(12) United States Patent
Cloud et al.

(10) Patent No.: US 10,889,376 B2
(45) Date of Patent: Jan. 12, 2021

(54) POWERED STOWAGE BIN ASSEMBLIES

(71) Applicant: THE BOEING COMPANY, Chicago, IL (US)

(72) Inventors: Mark L. Cloud, Seattle, WA (US); Christopher L. Schwitters, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 303 days.

(21) Appl. No.: 15/907,929

(22) Filed: Feb. 28, 2018

(65) Prior Publication Data

US 2019/0263525 A1    Aug. 29, 2019

(51) Int. Cl.
*B64D 11/00* (2006.01)
*E05F 15/42* (2015.01)
*E05F 15/627* (2015.01)
*E05F 15/73* (2015.01)

(52) U.S. Cl.
CPC ............ *B64D 11/003* (2013.01); *E05F 15/42* (2015.01); *E05F 15/627* (2015.01); *E05F 15/73* (2015.01); *B64D 2011/0053* (2013.01); *E05Y 2201/41* (2013.01); *E05Y 2201/422* (2013.01); *E05Y 2400/54* (2013.01); *E05Y 2400/86* (2013.01); *E05Y 2900/502* (2013.01)

(58) Field of Classification Search
CPC ... B64D 11/003; B64D 11/00; B64D 11/0627; B64D 11/0636; B64D 11/03; E05Y 2900/132; E06B 3/90; E06B 3/903; E05F 15/608

See application file for complete search history.

(56) References Cited

U.S. PATENT DOCUMENTS

| 4,210,349 A * | 7/1980 | Cook ................ E05F 5/027 16/84 |
| 2001/0011692 A1* | 8/2001 | Sprenger ........... B64D 11/003 244/118.5 |
| 2008/0078871 A1 | 4/2008 | Munson |
| 2010/0206985 A1* | 8/2010 | Rahlff ............... B64D 11/003 244/118.5 |

(Continued)

FOREIGN PATENT DOCUMENTS

EP     2492194     8/2012

OTHER PUBLICATIONS

U.S. Appl. No. 15/623,537, filed Jun. 15, 2017.
Extended European Search Report for EP 19159601.4, dated Jun. 5, 2019.

*Primary Examiner* — Richard R. Green
*Assistant Examiner* — William L Gmoser
(74) *Attorney, Agent, or Firm* — The Small Patent Law Group LLC; Joseph M. Butscher

(57) ABSTRACT

A stowage bin assembly is configured to be disposed within an interior cabin of a vehicle. The stowage bin assembly includes a strongback, and a pivot bin moveably coupled to the strongback. The pivot bin is configured to be moved between an open position and a closed position. A bin drive system is configured to move the pivot bin from the open position to the closed position. The bin drive system includes a motor operatively coupled to a bin actuator through a motion link. The motor is configured move the bin actuator via the motion link to push the pivot bin from the open position to the closed position.

20 Claims, 13 Drawing Sheets

(56) References Cited

U.S. PATENT DOCUMENTS

| | | | | |
|---|---|---|---|---|
| 2013/0026293 A1* | 1/2013 | Schneider | ............ | B64D 11/033 244/118.5 |
| 2013/0119199 A1* | 5/2013 | Merz | .................... | B64D 11/003 244/118.5 |
| 2014/0152159 A1* | 6/2014 | Schneider | ............ | B64D 11/003 312/248 |
| 2014/0246968 A1* | 9/2014 | Geng | .................... | B64D 11/003 312/319.2 |
| 2014/0332628 A1* | 11/2014 | Schneider | ............ | B64D 11/003 244/118.5 |
| 2015/0307192 A1 | 10/2015 | Savian | | |
| 2016/0075433 A1* | 3/2016 | Eakins | ................ | B64D 11/003 701/49 |
| 2017/0137130 A1* | 5/2017 | Kammerer | ............ | B64D 11/003 |
| 2017/0152044 A1* | 6/2017 | Balasubramanian | ........................ B64D 11/003 | |
| 2018/0009530 A1* | 1/2018 | Benthien | .............. | B64D 11/003 |
| 2019/0061950 A1* | 2/2019 | Hoogeveen | ............ | B64D 11/04 |
| 2019/0092473 A1* | 3/2019 | Benthien | .............. | B64D 11/003 |

\* cited by examiner

POWERED STOWAGE BIN ASSEMBLIES

FIELD OF EMBODIMENTS OF THE DISCLOSURE

Embodiments of the present disclosure generally relate to interior cabins within vehicles, such as commercial aircraft, and, more particularly, to powered stowage bin assemblies within interior cabins of vehicles.

BACKGROUND OF THE DISCLOSURE

Commercial aircraft typically include an interior cabin that may be divided into numerous sections. A cockpit is generally separated from a passenger cabin, which may include a first class section, a business class section, and a coach section. The passenger cabin may also include one or more work areas for flight personnel, such as galleys, which may include food and beverage storage structures. One or more aisles pass through the passenger cabin and connect each of the passenger sections to one or more paths and/or one or more doors of the aircraft.

Overhead stowage bins are typically positioned above rows of seats within a commercial aircraft. Each overhead stowage bin is configured to be moved between an open position and a closed position. In the open position, passengers may place carry-on luggage within a moveable bin or bucket. Before the aircraft leaves a terminal, flight attendants ensure that each stowage bin is securely closed.

In order to open a stowage bin, an individual (such as a passenger or flight attendant) physically touches a portion of the stowage bin, such as a button coupled to a latch. For example, the individual first presses the button in order to manipulate the stowage bin into an open position.

Before an aircraft departs from a location, the stowage bins within an interior cabin are closed. Typically, an individual such as a flight attendant manually closes the stowage bins. Fully loaded stowage bin assemblies may be heavy. As can be appreciated, manually closing multiple stowage bins within an interior cabin may be physically taxing.

SUMMARY OF THE DISCLOSURE

A need exists for a stowage bin assembly that may be easily closed. Further, a need exists for a stowage bin assembly that may be efficiently closed in an automatic manner.

With those needs in mind, certain embodiments of the present disclosure provide a stowage bin assembly that is configured to be disposed within an interior cabin of a vehicle. The stowage bin assembly includes a strongback, and a pivot bin moveably coupled to the strongback. The pivot bin is configured to be moved between an open position and a closed position. A bin drive system is configured to move the pivot bin from the open position to the closed position. The bin drive system includes a motor operatively coupled to a bin actuator through a motion link. The motor is configured move the bin actuator via the motion link to push the pivot bin from the open position to the closed position.

In at least one embodiment, the bin drive system is securely fixed to the strongback. The motion link may extend over an arcuate path.

The stowage bin assembly may include a latch that securely latches the pivot bin in the closed position. The stowage bin assembly may include an engagement button secured to the pivot bin. The engagement button is configured to be engaged to move the pivot bin from the open position towards and into the closed position.

The stowage bin assembly may include one or more sensors that are configured to output sensor alert signals that cease movement of the pivot bin towards the closed position. The sensor(s) may include a current sensor that is configured to detect a current input to or output by the motor. The sensor(s) may include a proximity or motion sensor that is configured to detect the presence of an object.

In at least one embodiment, a drive control unit is in communication with the bin drive system. The drive control unit is configured to control operation of the bin drive system.

In at least one embodiment, the bin actuator is configured to be moved away from a portion of the pivot bin towards and into a home position after the pivot bin is moved into the closed position.

The motion link may include a belt. The bin actuator may be operatively connected to the belt through a carriage. The bin actuator may include a pusher that is configured to push a protuberance extending from a rear surface of the pivot bin to move the pivot bin from the open position to the closed position. The pusher may be configured to separate from the protuberance after the pivot bin is moved into the closed position.

The bin actuator may be positioned behind a pivot point of the pivot bin as the pivot bin is moved between the open position and the closed position. The bin actuator may be configured to move downwardly and push the pivot bin into the closed position.

Certain embodiments of the present disclosure provide a method of operating a stowage bin assembly within an interior cabin of a vehicle. The method includes moveably coupling a pivot bin to a strongback within the interior cabin, operatively coupling a motor of a bin drive system to a bin actuator through a motion link, opening the pivot bin into an open position, and moving the pivot bin from the open position to a closed position by the bin drive system. The moving includes operating the motor to move the bin actuator via the motion link to push the pivot bin from the open position to the closed position.

DETAILED DESCRIPTION OF THE DISCLOSURE

Figure 1:
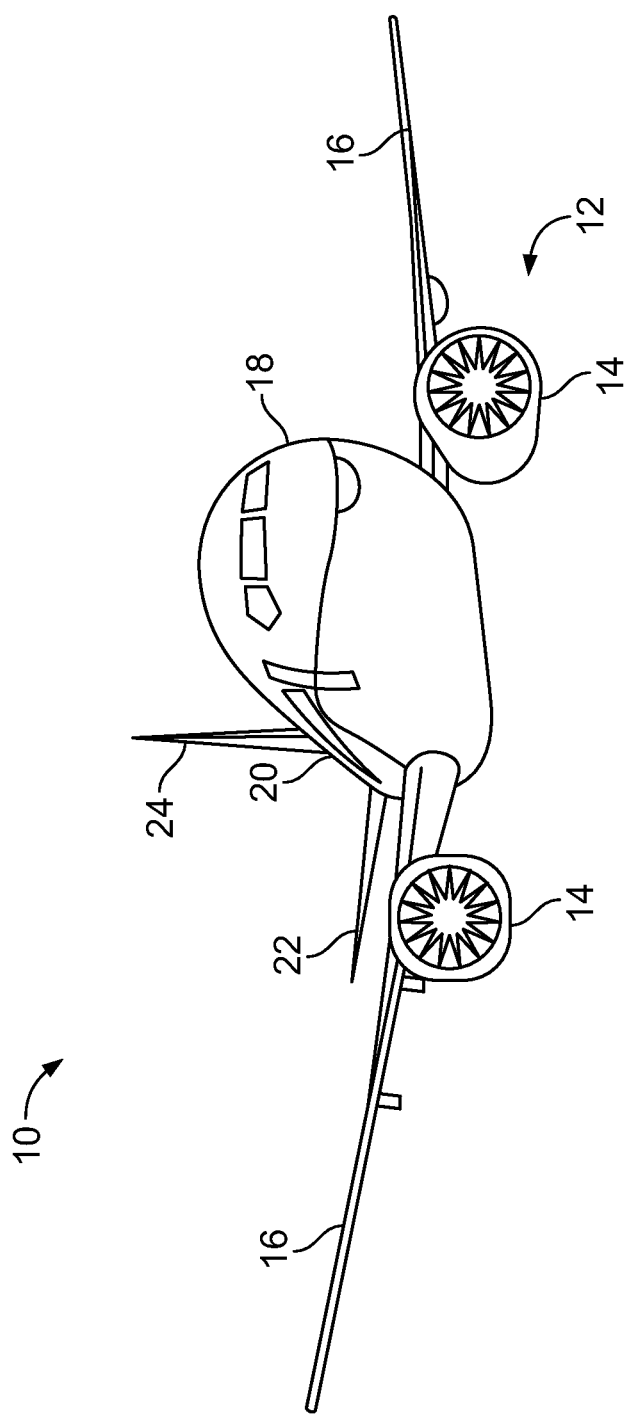
FIG. 1 illustrates a front perspective view of an aircraft, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a powered stowage bin assembly that is configured to automatically close a pivot bin in relation to a strongback. The stowage bin assembly is configured to push the pivot bin from an open position to a closed position.

The strongback may be a structure that forms a pivot point for a pivot bin. The strongback may be an overhead structure within an internal cabin. The strongback may be formed of metal, plastic, and/or composite material. The strongback may have various shapes and sizes. In at least one embodiment, the strongback may be or otherwise include metallic and/or composite bracketry, struts, and/or the like.

In at least one embodiment, a pivot point of the pivot bin is proximate to a center of mass of the pivot bin. A bin drive system is operatively coupled to the pivot bin to efficiently push the pivot bin into a closed position (instead of pulling or lifting). The bin drive system expends a reduced amount of energy closing the pivot bin due to the position of the pivot point in relation to the center of mass of the pivot bin.

Certain embodiments of the present disclosure provide a stowage bin assembly for a vehicle. The stowage bin assembly includes a pivot bin rotatably attached to a fixed vehicle structure (such as a strongback), and a bin drive system coupled to the fixed vehicle structure, and selectively attachable to the pivot bin. The bin drive system is selectively attachable to the pivot bin such that it applies a force on the pivot bin in one direction of rotation (such as in a closing direction). The stowage bin assembly may also include one or more sensors, such as a current sensor, a capacitive touch sensor, a latch condition sensor, and/or the like.

Certain embodiments of the present disclosure provide a method of operating a pivot stowage bin that includes unlatching a pivot bin with an electronic latch from a closed position thereby causing the pivot bin to move to a predisposed position (by gravity, spring force, and/or the like), performing at least one of loading or unloading contents of the pivot bin, and closing the bin by either engaging a bin drive system to apply a force to a side of the bin opposite a pivot such that the opening of the bin moves in an opposite direction than the force direction or closing the pivot bin manually.

The systems and methods described herein provide lightweight, reliable, inexpensive, and quality stowage bin assemblies. Further, the systems and methods improve passenger experience such as by providing stowage bin assemblies that may be easily and quickly closed. Further, by pushing the pivot bin into a closed position, the bin drive system takes advantage of leverage, such as due to the position of the bin drive system in relation to a pivot point of the pivot bin.

FIG. 1 illustrates a front perspective view of a vehicle, such as an aircraft 10, according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an interior cabin, which may include a cockpit, one or more work sections (for example, galleys, personnel carry-on baggage areas, and the like), one or more passenger sections (for example, first class, business class, and coach sections), and an aft section. Each of the sections may be separated by a cabin transition area. Overhead stowage bin assemblies are positioned throughout the interior cabin.

Alternatively, instead of an aircraft, embodiments of the present disclosure may be used with various other vehicles, such as automobiles, buses, locomotives and train cars, seacraft, spacecraft, and the like.

Figure 2A:
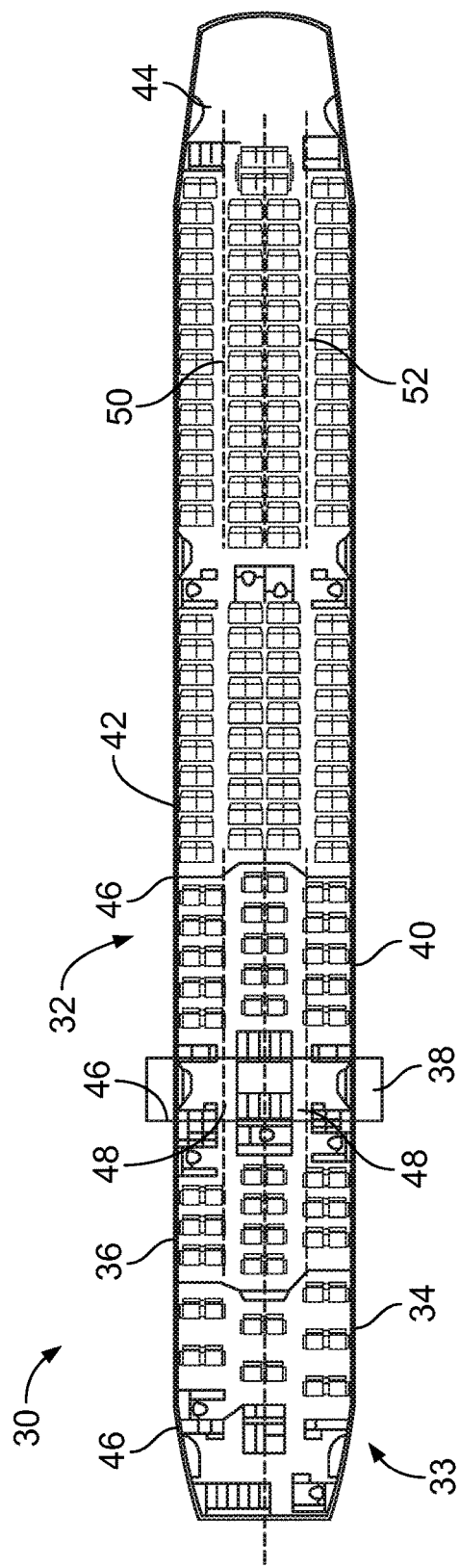
FIG. 2A illustrates a top plan view of an interior cabin of an aircraft, according to an embodiment of the present disclosure.

FIG. 2A illustrates a top plan view of an interior cabin 30 of an aircraft, according to an embodiment of the present disclosure. The interior cabin 30 may be within a fuselage 32 of the aircraft. For example, one or more fuselage wall members may define the interior cabin 30. The interior cabin 30 includes multiple sections, including a front section 33, a first class section 34, a business class section 36, a front galley station 38, an expanded economy or coach section 40, a standard economy or coach section 42, and an aft section 44, which may include multiple lavatories and galley stations. It is to be understood that the interior cabin 30 may include more or less sections than shown. For example, the interior cabin 30 may not include a first class section, and may include more or less galley stations than shown. Each of the sections may be separated by a cabin transition area 46, which may include class divider assemblies between aisles 48.

As shown in FIG. 2A, the interior cabin 30 includes two aisles 50 and 52 that lead to the aft section 44. Optionally, the interior cabin 30 may have less or more aisles than shown. For example, the interior cabin 30 may include a single aisle that extends through the center of the interior cabin 30 that leads to the aft section 44.

Figure 2B:
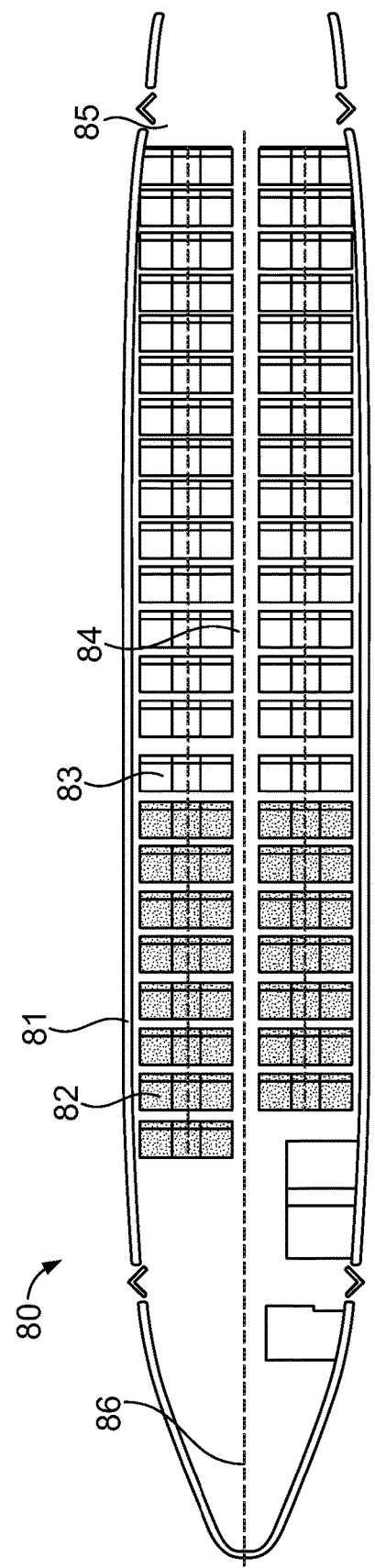
FIG. 2B illustrates a top plan view of an interior cabin of an aircraft, according to an embodiment of the present disclosure.

FIG. 2B illustrates a top plan view of an interior cabin 80 of an aircraft, according to an embodiment of the present disclosure. The interior cabin 80 may be within a fuselage 81 of the aircraft. For example, one or more fuselage wall members may define the interior cabin 80. The interior cabin 80 includes multiple sections, including a main cabin 82 having passenger seats 83, and an aft section 85 behind the main cabin 82. It is to be understood that the interior cabin 80 may include more or less sections than shown.

The interior cabin 80 may include a single aisle 84 that leads to the aft section 85. The single aisle 84 may extend through the center of the interior cabin 80 that leads to the aft section 85. For example, the single aisle 84 may be coaxially aligned with a central longitudinal plane 86 of the interior cabin 80.

Figure 3:
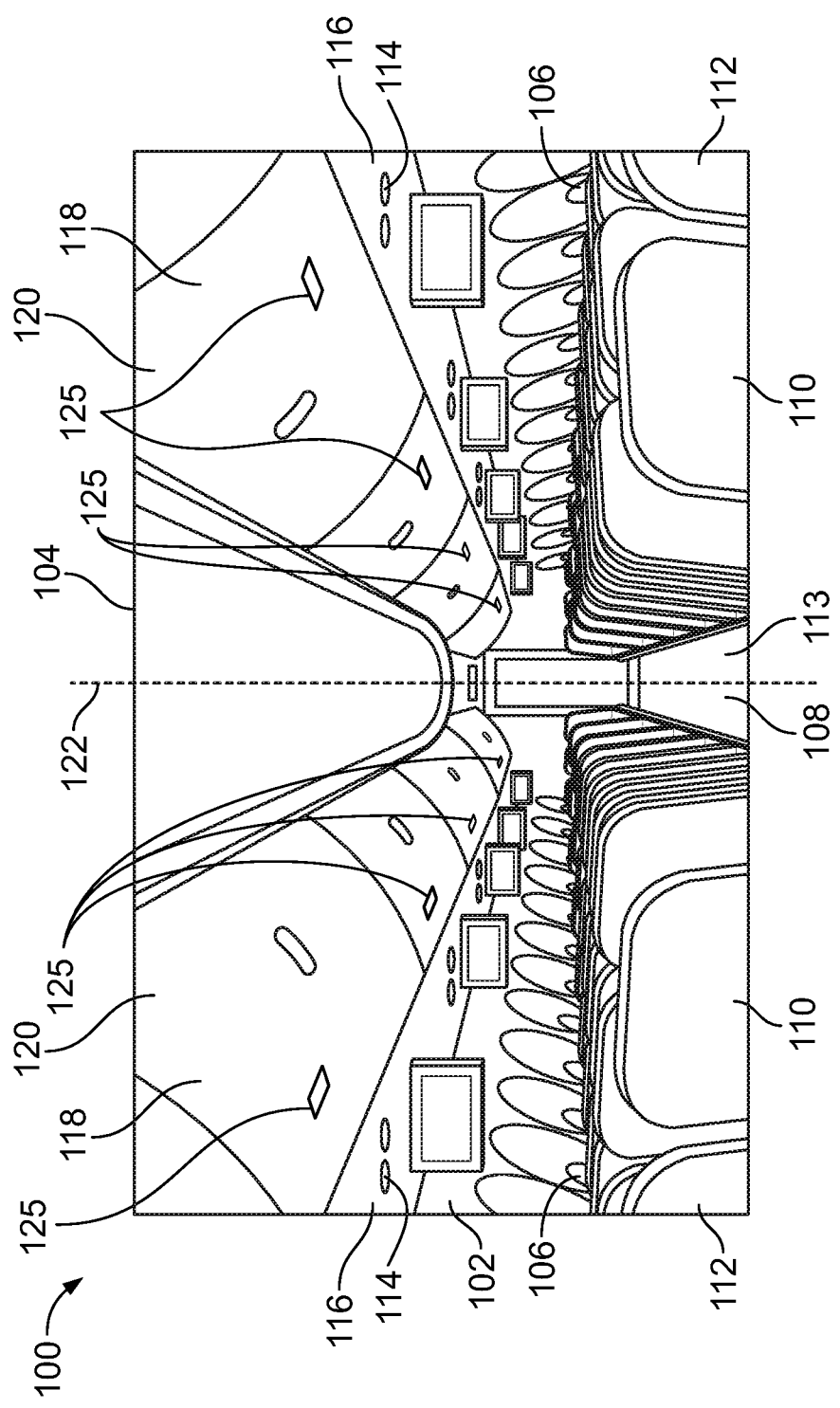
FIG. 3 illustrates an interior perspective view of an interior cabin of an aircraft, according to an embodiment of the present disclosure.

FIG. 3 illustrates an interior perspective view of an interior cabin 100 of an aircraft, according to an embodiment of the present disclosure. The interior cabin 100 includes outboard wall members 102 and a ceiling 104, which may include a plurality of ceiling panels. Windows 106 may be formed within the outboard wall members 102. A floor member 108 supports rows of seats 110. As shown in FIG. 3, a row 112 may include two seats 110 on either side of an aisle 113. However, the row 112 may include more or less seats 110 than shown. Additionally, the interior cabin 100 may include more aisles than shown.

Electrical devices such as PSUs 114 are secured between an outboard wall member 102 and the ceiling 104 on either side of the aisle 113. The PSUs 114 extend between a front end and rear end of the interior cabin 100. For example, a PSU 114 may be positioned over each seat 110 within a row 112. Each PSU 114 may include a housing 116 that generally contains passenger air outlets, reading lights, an oxygen supply system (such as an oxygen bag drop panel), an attendant call button, and other such controls over each seat 110 (or groups of seats) within a row 112.

Overhead stowage bin assemblies 118 are secured to the structure proximate to the ceiling 104 and/or the outboard wall member 102 above and inboard from the PSU 114 on either side of the aisle 113. The overhead stowage bin assemblies 118 are secured over the seats 110. The overhead stowage bin assemblies 118 extend between the front and rear end of the interior cabin 100. Each stowage bin assembly 118 may include a pivot bin or bucket 120 pivotally secured to a strongback (hidden from view in FIG. 3). The overhead stowage bin assemblies 118 may be positioned above and inboard from lower surfaces of the PSUs 114. The overhead stowage bin assemblies 118 are configured to be pivoted open in order to receive passenger carry-on baggage and personal items, for example.

As used herein, the term "outboard" means a position that is further away from a central longitudinal plane 122 of the interior cabin 100 as compared to another component. The term "inboard" means a position that is closer to the central longitudinal plane 122 of the interior cabin 100 as compared to another component. For example, a lower surface of a PSU 114 may be outboard in relation to a stowage bin assembly 118.

Electrical devices 125 may be mounted on the pivot bins 120 of the stowage bin assemblies 118. As shown, the electrical devices 125 may be secured to exterior surfaces of the buckets 120. Optionally, the electrical devices 125 may be secured to interior surfaces of the pivot bins 120. In at least one embodiment, the electrical devices 125 may be embedded within the pivot bins 120. The electrical device 125 may be one or more of an electric latch or lock, a speaker, a lighting assembly (such as one or more light emitting diodes), a monitor (such as a video screen and/or touchscreen), a fan, one or more sensors, and/or the like. Electrical devices may also be installed within a PSU trough, adjacent to reading light panels, for example.

The electrical device 125 in the form of an electric latch may be at various areas of the pivot bin 120. For example, the latches may be at or proximate a middle of a front face of the pivot bin 120, proximate upper ends, lower ends, lateral portions, and/or the like. In at least one embodiment, the latches may not be on the pivot bin 120, but may be on a structural feature to which the stowage bin assemblies 118 are secured.

Figure 4:
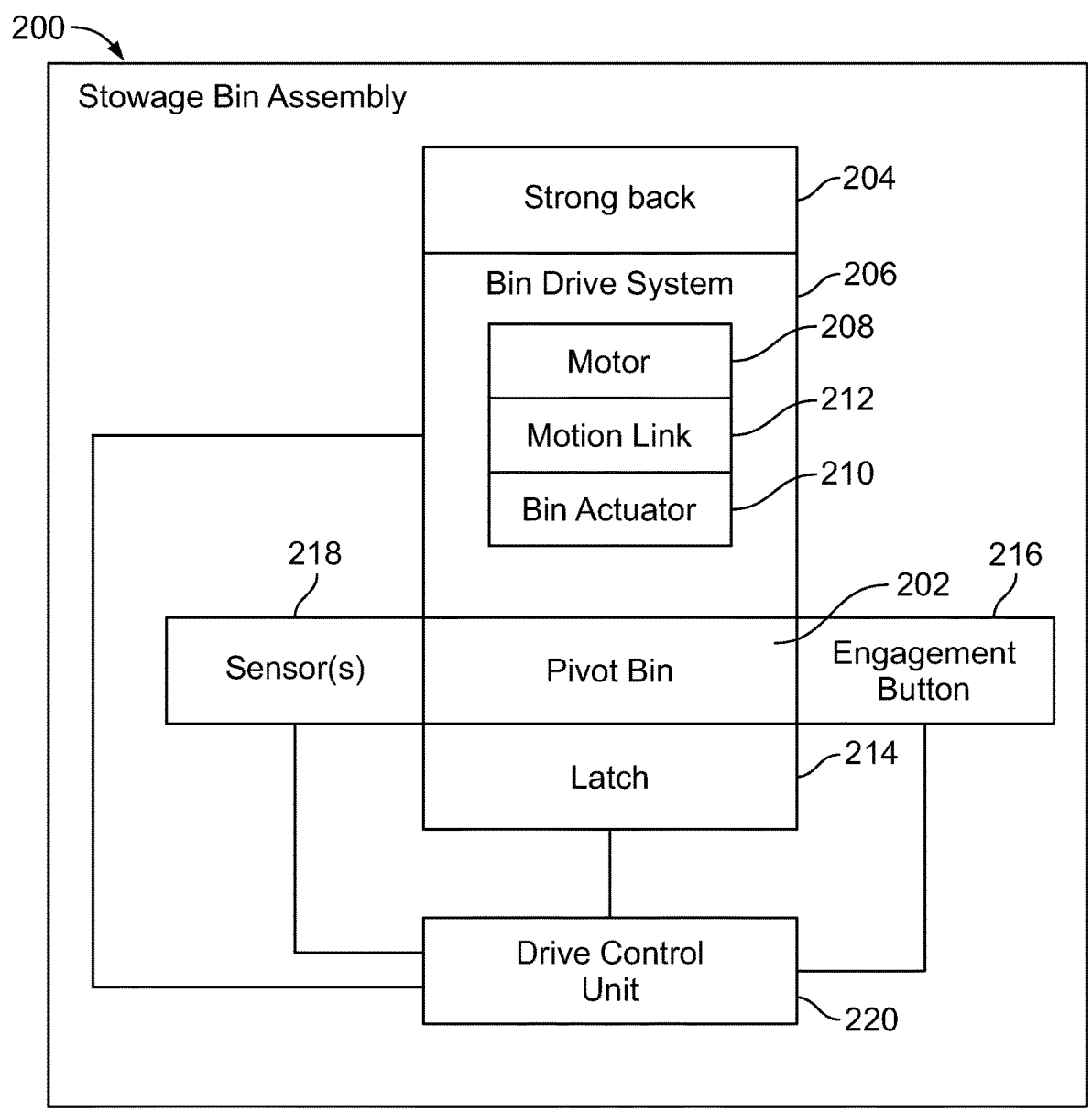
FIG. 4 illustrates a schematic box diagram of a stowage bin assembly, according to an embodiment of the present disclosure.

FIG. 4 illustrates a schematic box diagram of a stowage bin assembly 200, according to an embodiment of the present disclosure. The stowage bin assembly 118 shown in FIG. 3 is an example of the stowage bin assembly 200. The stowage bin assembly 200 includes a pivot bin 202 that is moveably secured to a fixed structure, such as a strongback 204. The pivot bin 120 shown in FIG. 3 is an example of the pivot bin 202. The pivot bin 202 is configured to be selectively moved in relation to the strongback 204 between an open position and a closed position.

A bin drive system 206 is operatively coupled to the strongback 204 and the pivot bin 202. For example, the bin drive system 206 may be mounted to the strongback 204 and configured to engage a portion of the pivot bin 202 to move the pivot bin 202 from the open position to the closed position.

The bin drive system 206 includes a motor 208 operatively coupled to a bin actuator 210 through a motion link 212. The motor 208 may be a rotary motor, a brushless direct current (DC) motor, and/or the like. The bin actuator 210 may be or otherwise include a push rod, block, foot, or the like that is configured to engage a portion of the pivot bin 202. The motion link 210 may be or otherwise include a drive belt, ball screw, worm screw, one or more gears, one or more pulleys, one or more tracks, one or more chains, and/or the like. The motion link 210 may extend over an arcuate path, for example. As such, at least a portion of the motion link 210 may be curved. In at least one other embodiment, the motion link 210 may extend over a straight linear path. In this embodiment, the motion link 210 may be straight. The motion link 210 may be sized and shaped to conform to a shape of the strongback 204 and/or the pivot bin 202. That is, the shape of the strongback 204 and/or the pivot bin 202 may dictate the size and shape of the motion link 210.

A latch 214 is coupled to the pivot bin 202. The latch 214 may be an electronic latch that is configured to securely latch the pivot bin 202 to the strongback 204 in the closed position. Alternatively, the stowage bin assembly 200 may not include the latch 214.

An engagement button 216 is secured to the pivot bin 202. The engagement button 216 may be an electronic membrane switch, key, engagement device, and/or the like that is configured to be pressed to send a signal to close the pivot bin 202 in relation to the strongback 204. Alternatively, the stowage bin assembly 200 may not include the engagement button 216.

One or more sensors 218 may be secured to the pivot bin 202 and/or the strongback 204. The sensor(s) 218 may include a current sensor that is configured to detect a current input required by the motor and/or a current output by the motor 208, a proximity or motion sensor (such as an infrared sensor, an ultrasonic sensor, and/or the like) that is configured to detect the presence of an object (for example, a hand), and/or the like. Alternatively, the stowage bin assembly 200 may not include the sensor(s) 218.

A drive control unit 220 is in communication with the bin drive system 206, the latch 214, the engagement button 216, and the sensors 218 through one or more wired or wireless connections. Each stowage bin assembly 200 may include a drive control unit 220. In at least one other embodiment, a single drive control unit 220 may be operatively coupled to a plurality of stowage bin assemblies 200. The drive control unit 220 may be secured to a portion of the strongback 204 or the pivot bin 202. In at least one other embodiment, the drive control unit 220 may be remotely located from the pivot bin 202 and the strongback 204.

In operation, in order to move the pivot bin 202 into the open position in relation to the strongback 204, an individual engages a portion of the pivot bin 202, such as the engagement button 216, the latch 214, and/or the like. The pivot bin 202 then opens, such as through the force of gravity. One or more dampers may be coupled to the pivot bin 202 and the strongback 204 in order to control an opening rate of the pivot bin 202. In at least one embodiment, the bin drive system 206 does not open or assist in opening the pivot bin 202.

In order to move the pivot bin 202 into the closed position, an individual engages (for example, touches, swipes, or waves a hand in proximity to) the engagement button 216. As the engagement button 216 is engaged (such as through finger pressure, detected presence of a finger, and/or the like), the engagement button 216 outputs a closing signal to the drive control unit 220. The drive control unit 220 receives the closing signal from the engagement button 216 and operates the bin drive system 206 to close the pivot bin 206. In particular, the drive control unit 220 operates the motor 208 to move the bin actuator 210 via the motion link 212 to push the pivot bin 202 into a closed position. The bin actuator 210 may move into a rear portion of the pivot bin 202 and push the pivot bin 202 towards and into the closed position.

In the closed position, the latch 214 securely latches the pivot bin 202 into the closed position in relation to the strongback 204. The drive control unit 220 receives the latching signal from the latch 214 indicating that the pivot bin 202 is in the closed position. In response, the drive control unit 220 operates the bin drive system 206 so that the motor 208 reverses the bin actuator 210 away from the pivot bin 202 back to a home position. Once the bin actuator 210 is returned to the home position, the drive control unit 220 deactivates the motor 208.

The drive control unit 220 may monitor signals output by the sensor(s) 218 to determine whether to cease a closing operation of the pivot bin 202. For example, a current sensor 218 coupled to the motor 208 may detect current signals related to the motor 208. If the motor 208 is drawing, requiring and/or outputting a current above a particular threshold (such as if an individual is pulling down on the pivot bin 202), the drive control unit 220 may cease the closing operation, such as by deactivating the motor 208 or operating the motor 208 in a reverse direction. As another example, a proximity or motion sensor 218 may be coupled to the pivot bin 202 at a front edge. If a motion signal is output by the sensor 218 (such as if a hand or finger is positioned between the pivot bin 202 and the strongback 204 during a closing operation), the drive control unit 220 ceases the closing operation or operates the motor 208 in a reverse direction.

In at least one embodiment, the current sensor 218 detects the current input to the motor 208. The motor 208 draws as much current as needed to lift the weight of the pivot bin 202 at a set speed within a maximum predetermined limit, such as may be stored as a threshold within a memory coupled to the drive control unit 220. The threshold can be change depending on a closing state of the pivot bin 202. The amount of current draw falls off the bin contents shift towards the pivot point, thus the trip point for a commend to return home can change. In at least one embodiment, the current sensor 218 itself may be provide an output to the drive control unit 220.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the drive control unit 220 may be or include one or more processors that are configured to control operations, as described herein.

The drive control unit 220 is configured to execute a set of instructions that are stored in one or more data storage units or elements (such as one or more memories), in order to process data. For example, the drive control unit 220 may include or be coupled to one or more memories. The data storage units may also store data or other information as desired or needed. The data storage units may be in the form of an information source or a physical memory element within a processing machine.

The set of instructions may include various commands that instruct the drive control unit 220 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, in response to results of previous processing, or in response to a request made by another processing machine.

The diagrams of examples herein may illustrate one or more control or processing units, such as the drive control unit 220. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the drive control unit 220 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 5:
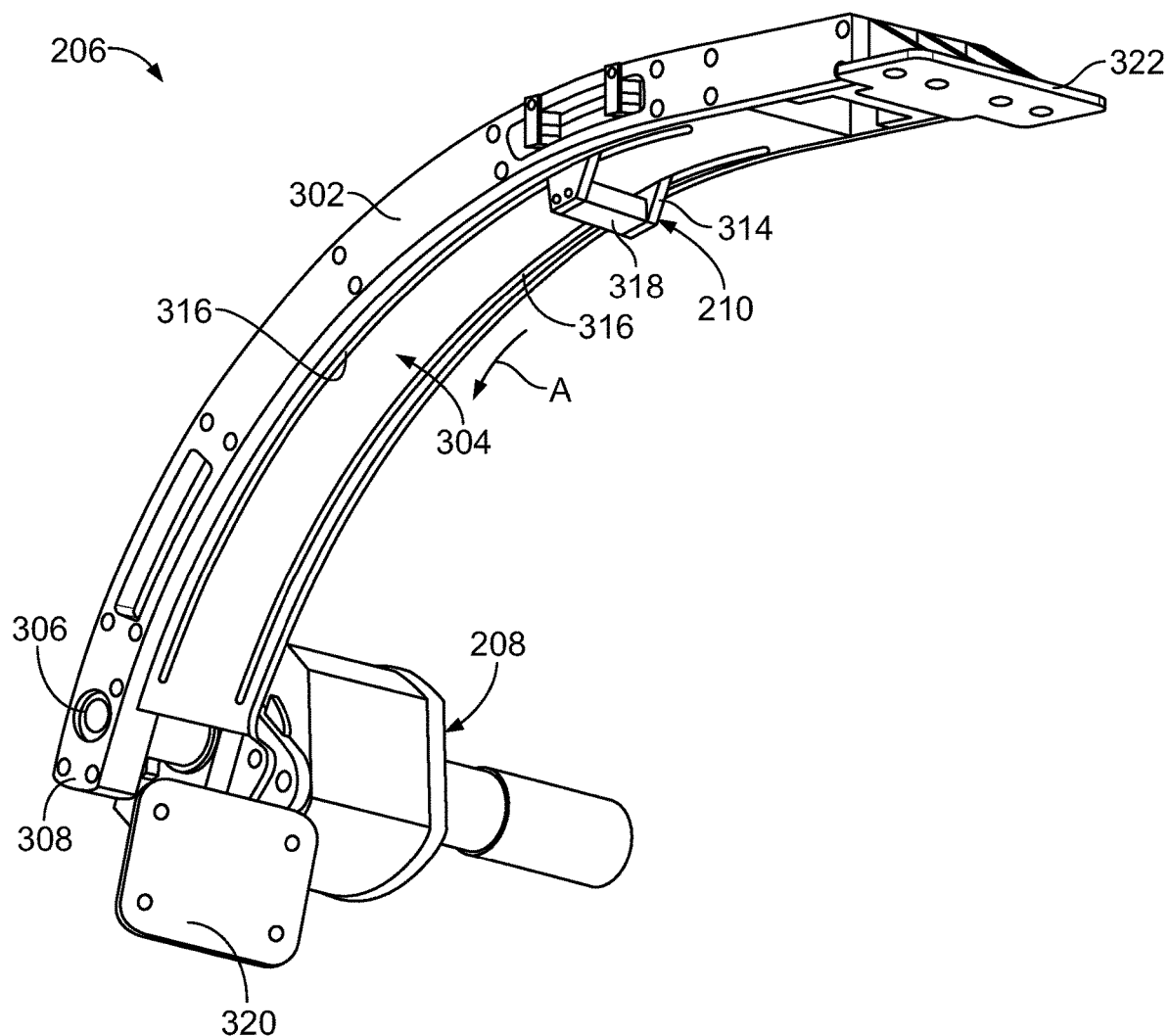
FIG. 5 illustrates a perspective front view of a bin drive system, according to an embodiment of the present disclosure.
Figure 6:
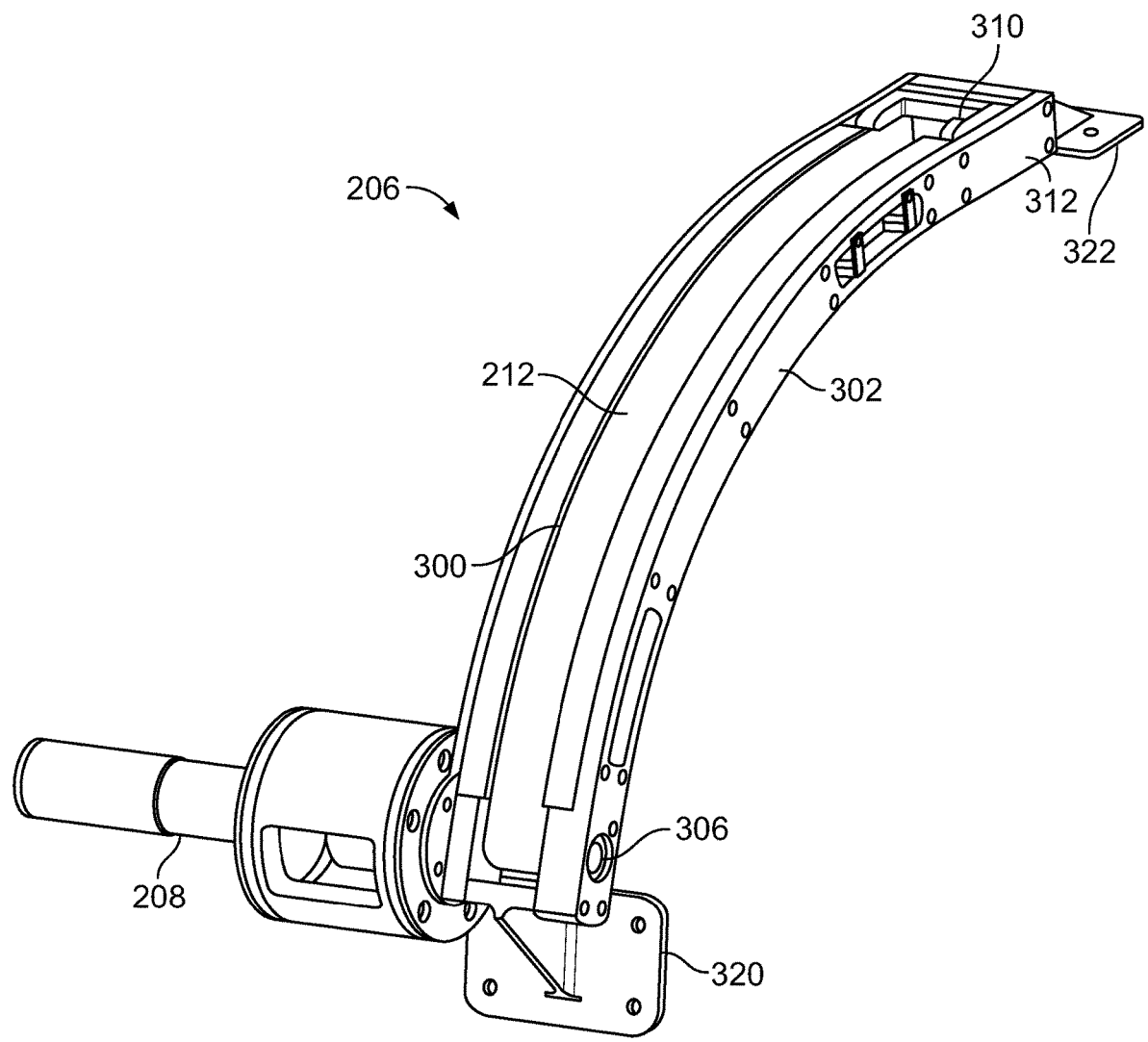
FIG. 6 illustrates a perspective rear view of a bin drive system, according to an embodiment of the present disclosure.

FIG. 5 illustrates a perspective front view of a bin drive system 206, according to an embodiment of the present disclosure. FIG. 6 illustrates a perspective rear view of the bin drive system 206. Referring to FIGS. 5 and 6, the motion link 212 may be a belt 300 that is retained within an arcuate bracket 302. A protective cover 304 may cover a front face of the belt 300. The belt 300 is operatively connected to a drive cog 306 at one end 308 of the bracket 302 and an idler cog 310 at an opposite end 312 of the bracket 302. The drive cog 306 is operatively coupled to the motor 208 (such as a drive axle of the motor 208). As the motor 208 is activated, the drive cog 306 and the idler cog 310 rotate in response thereto to move the belt 300.

The bin actuator 210 is operatively connected to the belt 300 through a carriage 314. For example, the carriage 314 may be secured to and around portions of the belt 300. The carriage 314 extends through track channels 316 formed through the cover 304. The bin actuator 210 includes a pusher 318 connected to the carriage 314. The pusher 318 is outside of the bracket 302. The pusher 318 may be a block, pin, rod, or the like. As the motor 208 is operated in a closing direction, the motion link 212 (such as via motion of the belt 300) causes the bin actuator 210 to move downwardly towards the motor 208 in the direction of arc A.

The bin drive system 206 may also include a mounting plate 320 proximate to the first end 308 and a mounting plate 322 proximate to the second end 312. The mounting plates 320 and 322 are configured to securely mount the bin drive system 206 to a fixed structure, such as through fasteners, adhesives, or the like.

Figure 7:
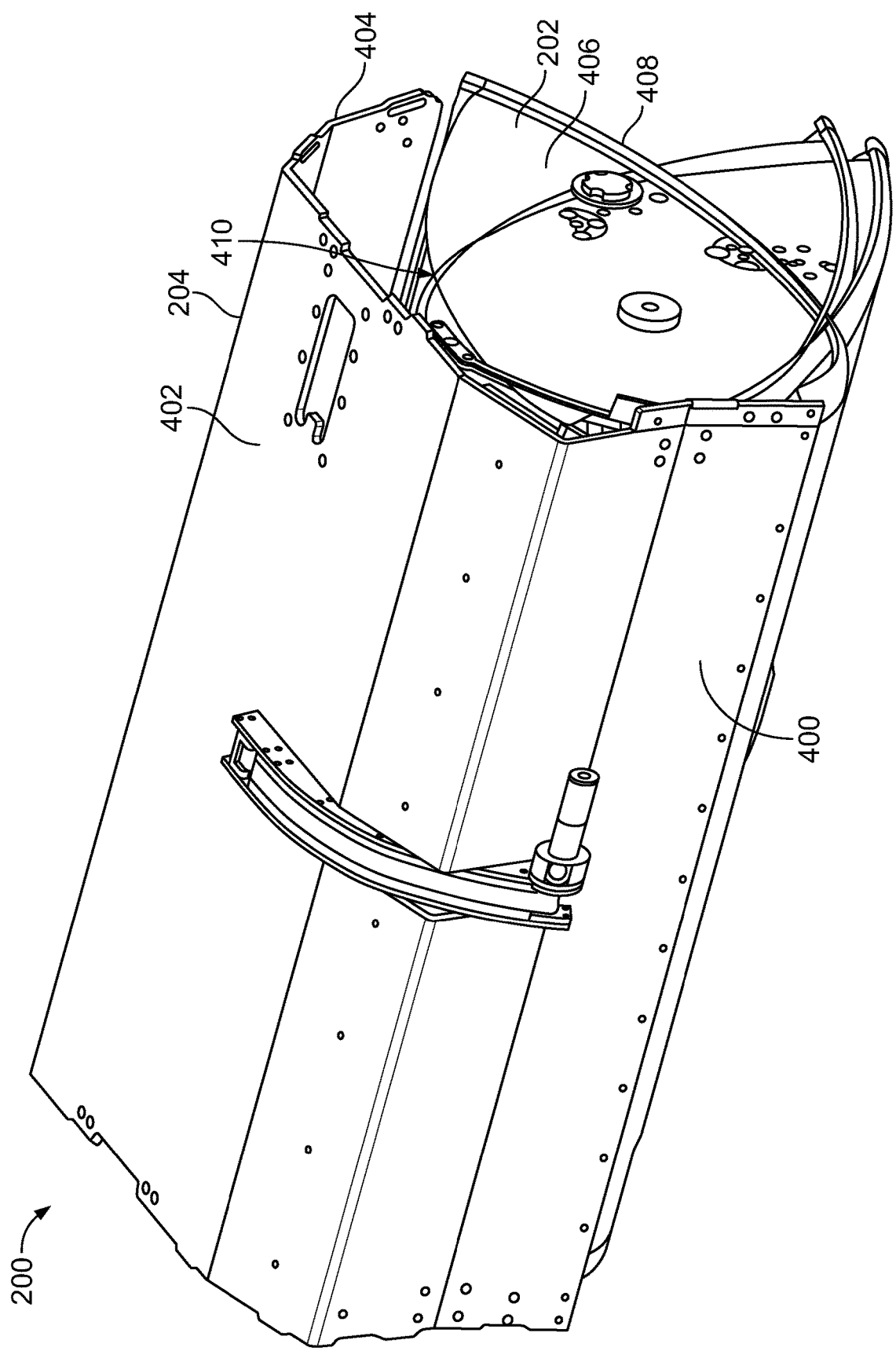
FIG. 7 illustrates a perspective rear top view of a stowage bin assembly, according to an embodiment of the present disclosure.

FIG. 7 illustrates a perspective rear top view of the stowage bin assembly 200, according to an embodiment of the present disclosure. The strongback 204 includes a rear panel 400 connected to an upper panel 402, which, in turn, connects to a front panel 404. The pivot bin 202 includes opposed end panels 406 connected to a front cover 408. A retaining chamber 410 is defined between the end panels 406 and the front cover 408.

The bin drive system 206 is mounted to the strongback 204. For example, the mounting plates 320 and 322 (shown in FIGS. 5 and 6) are used to securely fasten the bracket 302 to the strongback 204.

Figure 8:
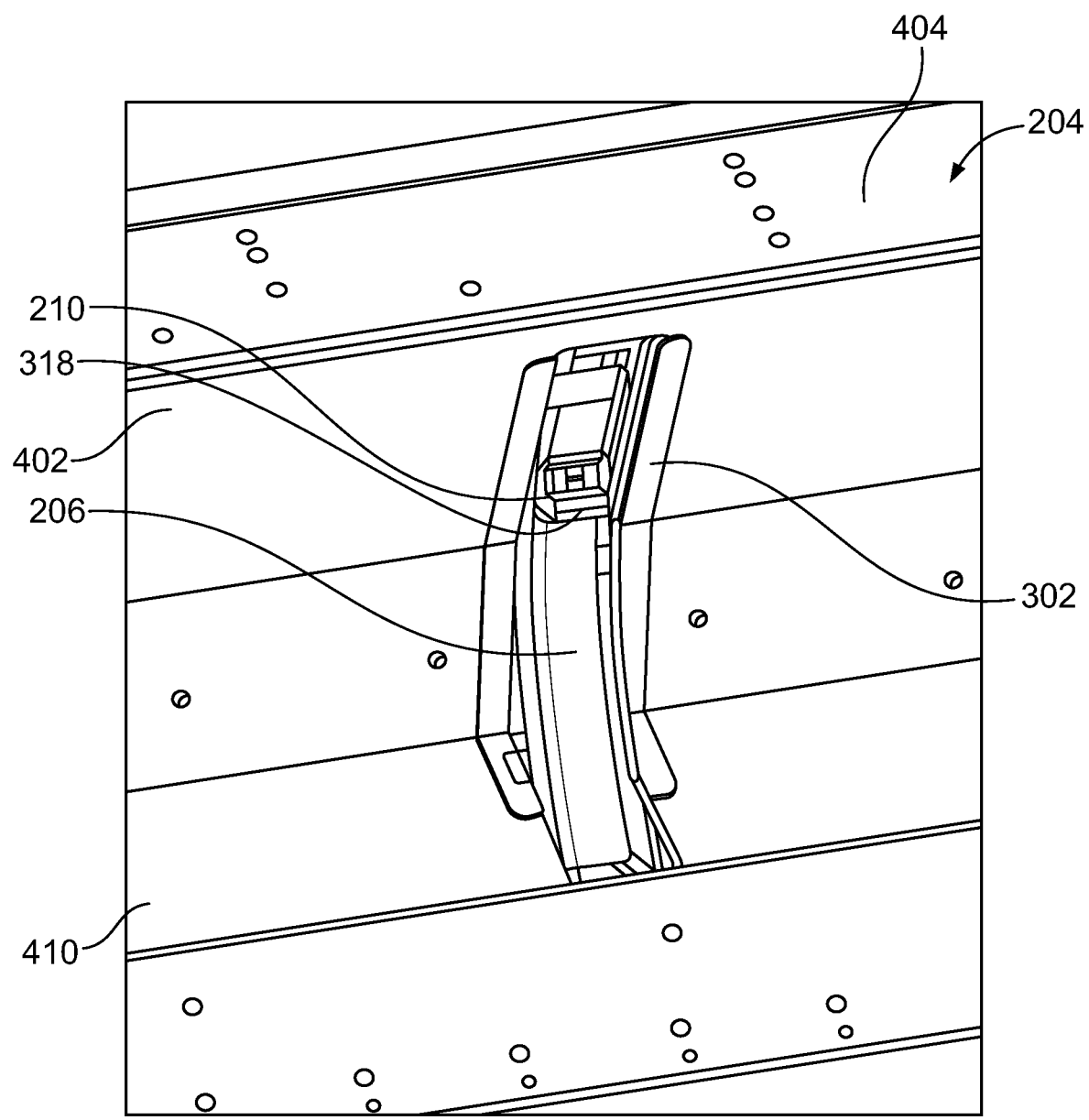
FIG. 8 illustrates a perspective interior view of a strongback having a bin drive system secured thereto, according to an embodiment of the present disclosure.

FIG. 8 illustrates a perspective interior view of the strongback 204 having the bin drive system 206 secured thereto, according to an embodiment of the present disclosure. As shown, the bin actuator 210 extends through the strongback 204 in order to be able to engage a portion of the pivot bin 202 (not shown in FIG. 8). As indicated above, the bin drive system 206 is sized and shaped to generally conform to the shape of the strongback 204. The bin drive system 206 may be sized and shaped in a different manner than shown, such as if the strongback 204 is shaped in a different manner than shown.

Figure 9:
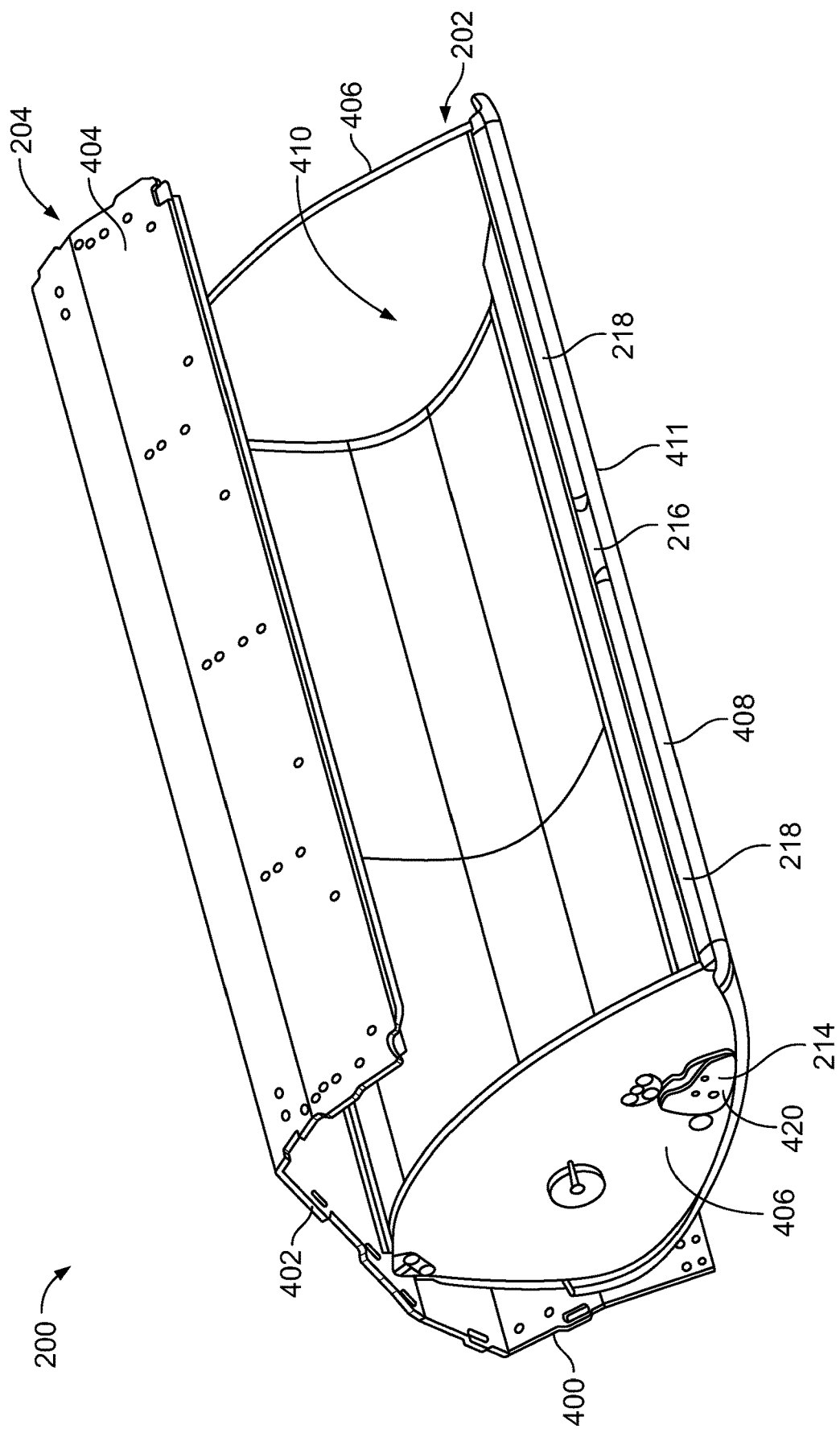
FIG. 9 illustrates a perspective front view of a stowage bin assembly in an open position, according to an embodiment of the present disclosure.

FIG. 9 illustrates a perspective front view of the stowage bin assembly 200 in an open position, according to an embodiment of the present disclosure. As shown, the engagement button 216 may be on or otherwise proximate to an exposed front edge 411 of the pivot bin 202. Proximity sensors 218 (such as infrared sensor, ultrasonic sensors, or the like) may also be secured proximate to the edge 411. The proximity sensors 218 are configured to detect a presence of an object (such as a portion of a bag or other luggage) that may be positioned between the edge 411 and the strongback 204.

The latch 214 may include a latching mechanism 420 secured to an outer surface of an end panel 406 of the pivot bin 202. The latching mechanism 420 is configured to selectively connect to a reciprocal latching mechanism of the strongback 404 to securely latch the pivot bin 202 in a closed position.

Figure 10:
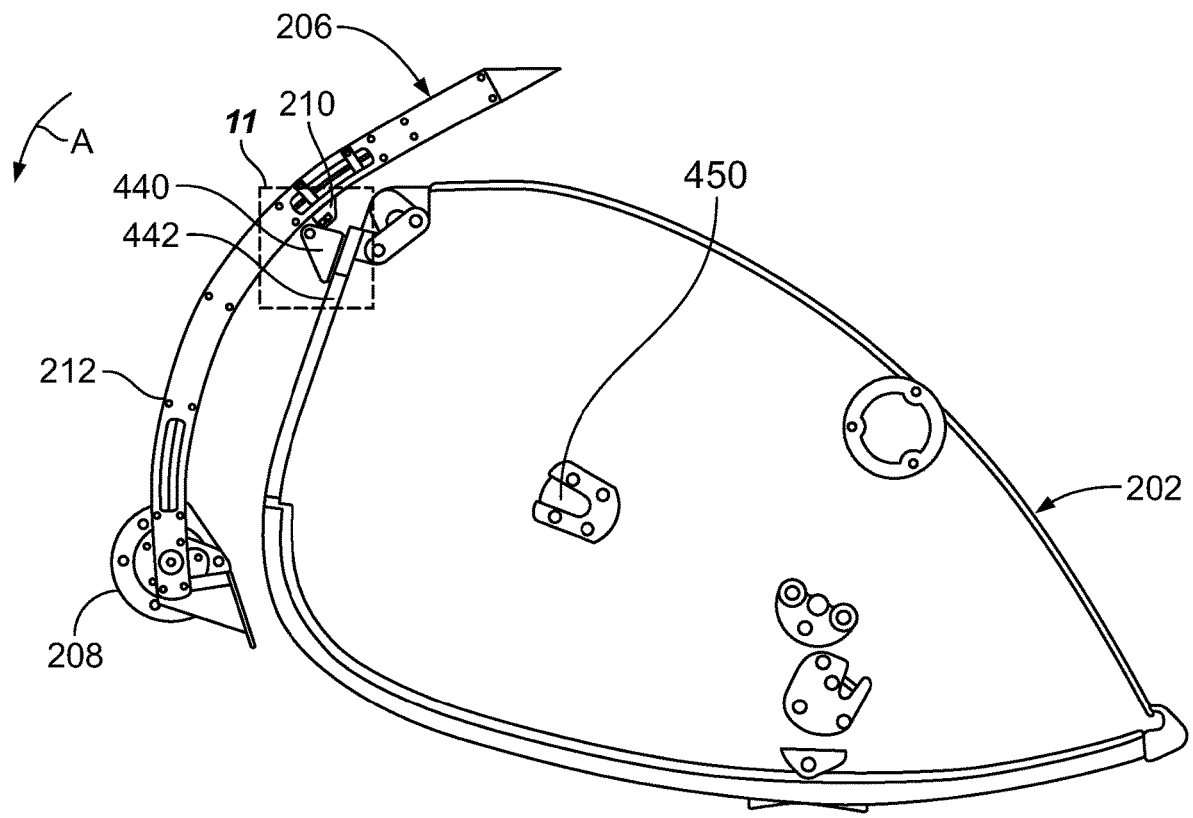
FIG. 10 illustrates a lateral view of a stowage bin assembly having a pivot bin in an open position, according to an embodiment of the present disclosure.
Figure 11:
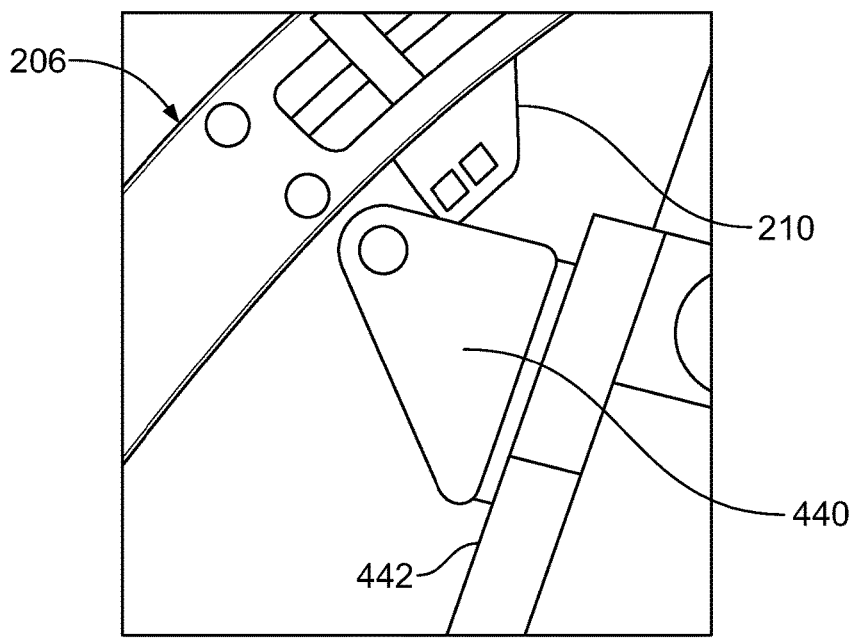
FIG. 11 illustrates a lateral view of a bin actuator engaging a portion of a pivot bin, according to an embodiment of the present disclosure.

FIG. 10 illustrates a lateral view of the stowage bin assembly 200 having the pivot bin 202 in an open position, according to an embodiment of the present disclosure. FIG. 11 illustrates a lateral view of the bin actuator 210 engaging a portion of the pivot bin 202. Referring to FIGS. 10 and 11, the bin actuator 210 may engage a protuberance 440 that outwardly extends from a rear surface 442 of the pivot bin 202. The protuberance 440 may be a stud, fin, panel, block, or the like.

The bin actuator 210 may be separable from the protuberance 440. For example, the bin actuator 210 engages and pushes the protuberance 440 to move the pivot bin 202 from the open position to the closed position. The bin actuator 210 may then be separated from the protuberance 440 after the pivot bin 202 is moved into the closed position.

When the pivot bin 202 is in the open position, as shown in FIG. 10, the bin actuator 210 is positioned above and behind a pivot point 450 (for example, a pivot axis) of the pivot bin 202. The pivot point 450 is proximate to a center of mass of the pivot bin 202. In order to close the pivot bin 202, the bin actuator 210 moves downwardly in the direction of arc A along the motion link 212 to a side and above the pivot point 450, thereby efficiently using leverage to push the pivot bin 202 towards a closed position. The bin actuator 210 pushes the pivot bin 202 towards and into a closed position, instead of pulling the pivot bin 202, thereby exerting less energy.

If an individual pushes the pivot bin 202 towards a closed position at a faster rate than the bin actuator 210 pushes downwardly on the protuberance 440, the protuberance 440 separates from the bin actuator 210, which continues to move downwardly along the motion link 212. As such, an individual may opt to manually close the pivot bin 202 at a faster rate than the bin drive system 206.

Figure 12:
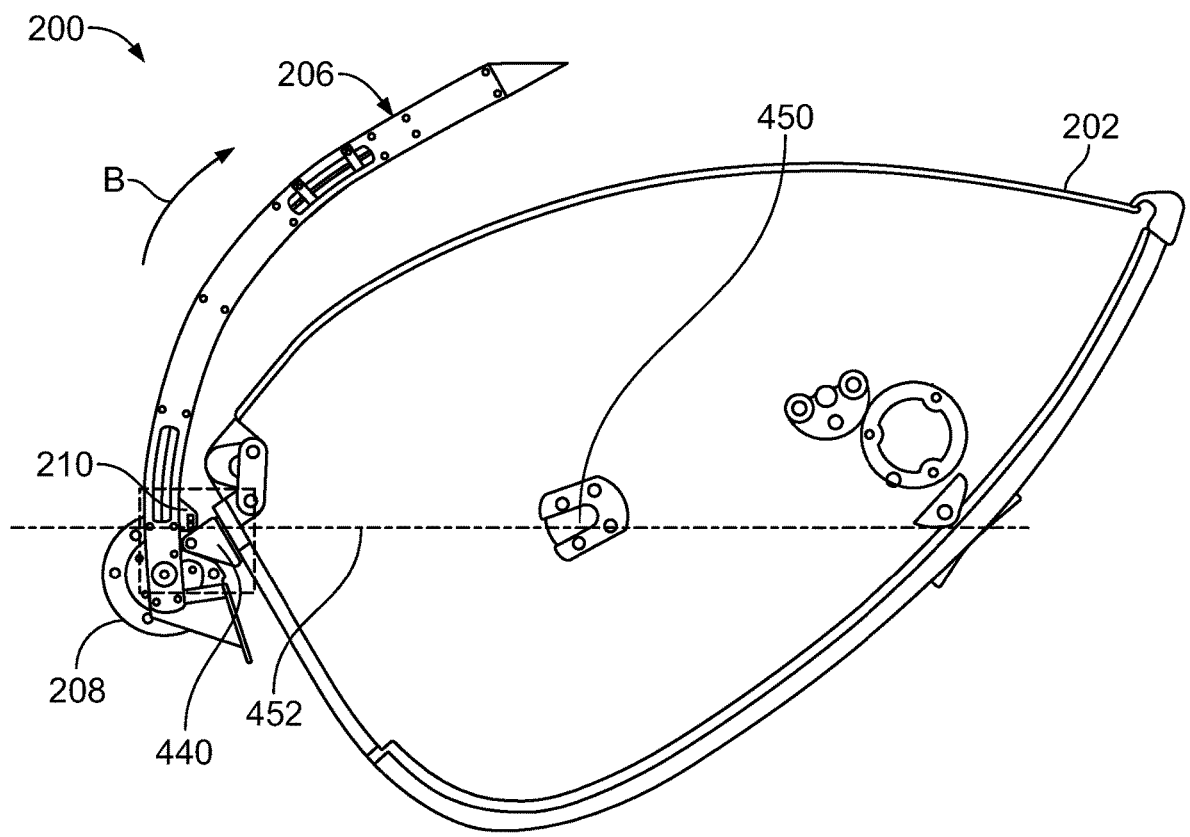
FIG. 12 illustrates a lateral view of a stowage bin assembly having a pivot bin in a closed position, according to an embodiment of the present disclosure.
Figure 13:
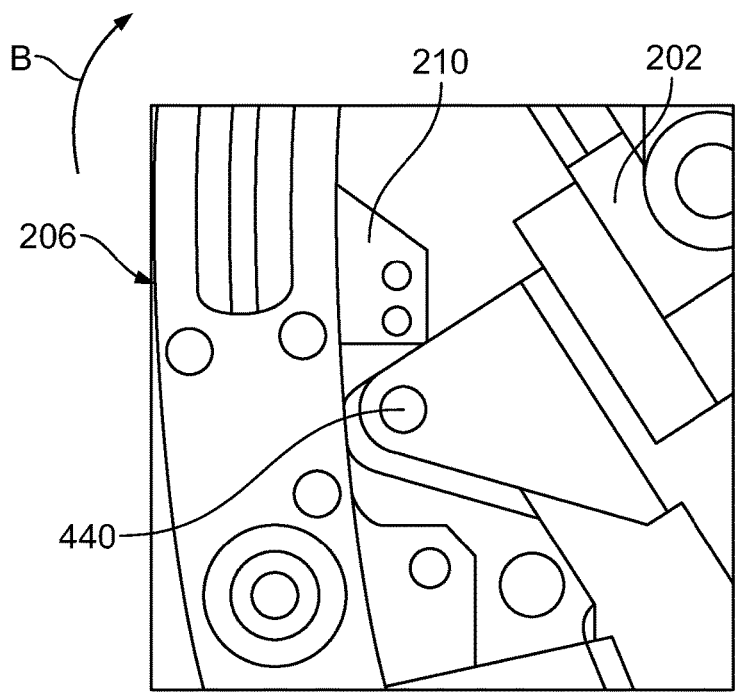
FIG. 13 illustrates a lateral view of a bin actuator engaging a portion of a pivot bin when the pivot bin is in a closed position, according to an embodiment of the present disclosure.

FIG. 12 illustrates a lateral view of the stowage bin assembly 200 having the pivot bin 202 in the closed position, according to an embodiment of the present disclosure. FIG. 13 illustrates a lateral view of the bin actuator 210 engaging the protuberance 440 of the pivot bin 202 when the pivot bin 202 is in the closed position. Referring to FIGS. 4, 12, and 13, when the latch 214 latches the pivot bin 202 into a closed position, the drive control unit 220 receives the latching signal from the latch 214. In response, the drive control unit 220 operates the motor 208 to back the bin actuator 210 away from the protuberance 440 towards a home position in the direction of arc B.

Figure 14:
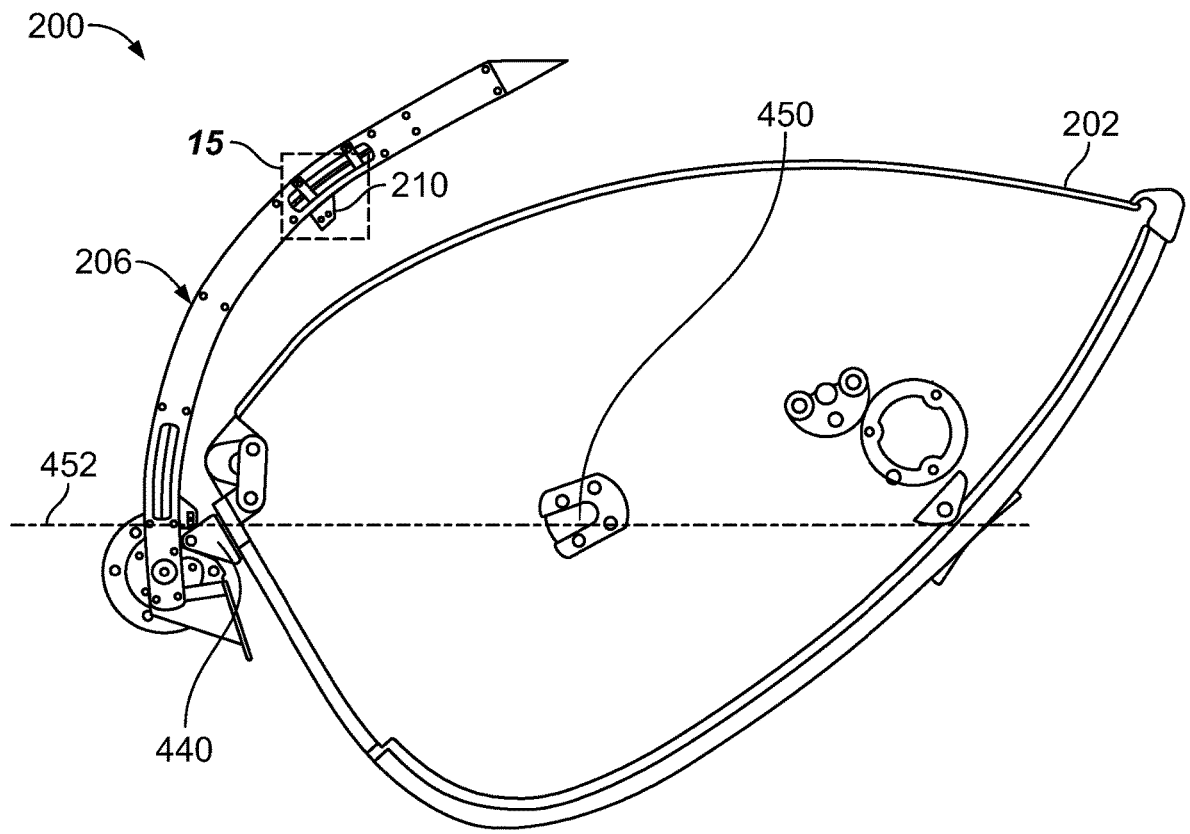
FIG. 14 illustrates a lateral view of a stowage bin assembly having a pivot bin in a closed position and a bin actuator in a home position, according to an embodiment of the present disclosure.
Figure 15:
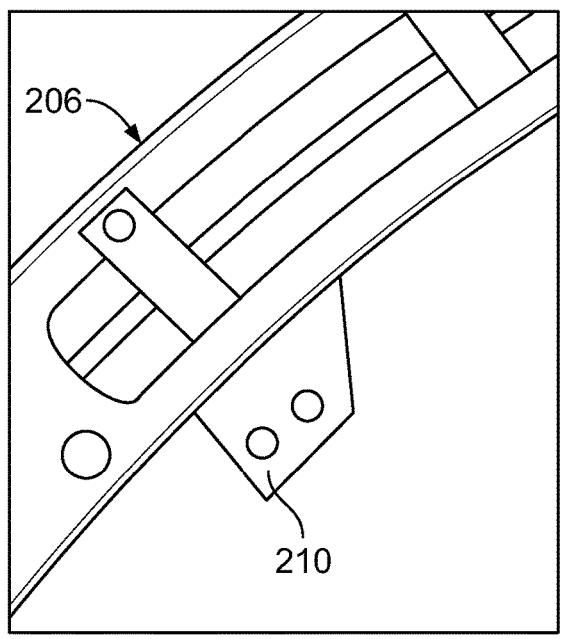
FIG. 15 illustrates a lateral view of a bin actuator in a home position, according to an embodiment of the present disclosure.

FIG. 14 illustrates a lateral view of the stowage bin assembly 200 having the pivot bin 202 in the closed position and the bin actuator 210 in the home position, according to an embodiment of the present disclosure. FIG. 15 illustrates a lateral view of the bin actuator 210 in the home position. As shown in FIGS. 14 and 15, when the pivot bin 202 is closed and the bin actuator 210 is in the home position, the bin actuator 210 is separated from the protuberance 440. The home position may be at a point at which the bin actuator 210 is able to engage the protuberance 440 only when the pivot bin 202 is in a fully opened position, such as shown in FIG. 10.

As shown in FIGS. 12 and 14, in the closed position, the protuberance 440 may be aligned with the pivot point 450 along a plane 452 that may not be below the pivot point 450. Referring to FIGS. 10-15, the bin actuator 210 takes advantage of leverage to push the rear surface 442 of the pivot bin 202 via the protuberance 440 without dipping below the pivot point 450 or pulling/lifting any portion of the pivot bin 202 during a closing operation.

Referring to FIGS. 4-15, the drive control unit 220 monitors the sensors 218 during the closing operation. If, for example, a current sensor spikes above a predetermined threshold (such as that associated with a fully loaded pivot bin 202), the drive control unit 220 ceases the closing operation, and may back the bin actuator 210 away from the protuberance 440. As another example, if the sensors 218 detect motion or an object (for example, a portion of a stowed bag) between the front edge 411 of the pivot bin 202 and the strongback 204 during the closing operation, the drive control unit 220 ceases the closing operation and may back the bin actuator 210 away from the protuberance 440.

As described herein, the bin drive system 206, in particular the bin actuator 210, is not rigidly fixed to the pivot bin 202. Rather, the bin actuator 210 is configured to push the pivot bin 202 into a closed position. If the pivot bin 202 is manually closed faster than the bin drive system 206 is able to close the pivot bin 202, the protuberance 440 separates from the bin actuator 210, and the bin drive system 206 resets in response to the latch(es) 214 latching the pivot bin 202 into the closed position.

Figure 16:
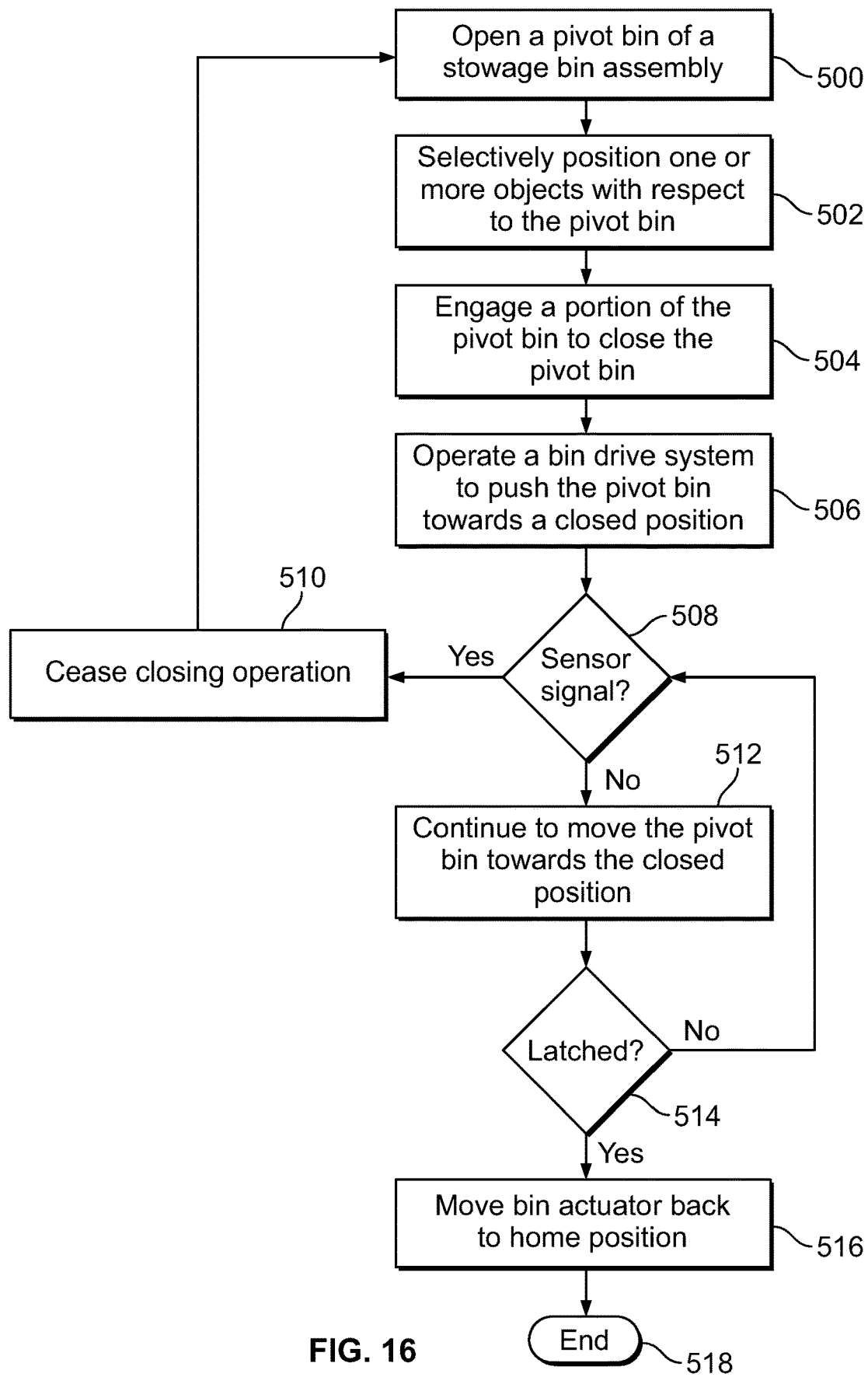
FIG. 16 illustrates a flow chart of a method of operating a stowage bin assembly, according to an embodiment of the present disclosure.

FIG. 16 illustrates a flow chart of a method of operating a stowage bin assembly, according to an embodiment of the present disclosure. Referring to FIGS. 4 and 16, the method beings at 500, at which the pivot bin 202 of the stowage bin assembly 200 is opened. At 502, an individual selectively positions one or more objects (such as luggage, bags, or the like) with respect to the pivot bin 202. For example, an individual may position bags in (or remove bags from) the open pivot bin 202.

At 504, an individual engages a portion of the pivot bin 202 (such as the engagement button 216) to close the pivot bin 202. Optionally, a closing signal may be output from a master control system (such as at a flight attendant work station, the cockpit, or the like) to close the pivot bin 202. The closing signal output by the engagement button 216 or the master control system is received by the drive control unit 220, which then operates the bin drive system 206 to push the pivot bin 202 towards a closed position at 506.

At 508, the drive control unit 220 monitors the sensor(s) 218 to determine if any sensor alert signals (that is, signals that alert the drive control unit 220 to cease the closing operation) are output. If a sensor alert signal is received by the drive control unit 220, the drive control unit 220 ceases the closing operation at 510, and the method may return to 500.

If, however, a sensor alert signal is not received at 508, the method proceeds to 512, at which the drive control unit 220 continues to operate the bin drive system 206 to move the pivot bin 202 towards the closed position. At 514, the drive control unit 220 determines if the pivot bin 202 is latched into a closed position, such as via a latching signal received from the latch(es) 214. If the pivot bin 202 is not latched into a closed position at 514, the method returns to 508.

If, however, the drive control unit 220 determines that the pivot bin 202 is latched in closed position, the method proceeds to 516, at which the drive control unit 220 operates the bin drive system 206 to move the bin actuator 210 back to a home position. The method then ends at 518.

As described herein, embodiments of the present disclosure provide a stowage bin assembly that may be easily closed. In particular, the stowage bin assembly includes the pivot bin that is configured to be efficiently closed in an automatic manner via operation of the bin drive system.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A stowage bin assembly that is configured to be disposed within an interior cabin of a vehicle, the stowage bin assembly comprising:
    a strongback;
    a pivot bin moveably coupled to the strongback, wherein the pivot bin is configured to be moved between an open position and a closed position; and
    a bin drive system that is configured to move the pivot bin from the open position to the closed position, wherein the bin drive system comprises a motor operatively coupled to a bin actuator through a motion link, wherein the motor is configured to move the bin actuator via the motion link to to push the pivot bin from the open position to the closed position; wherein the bin actuator is configured to be moved away from a portion of the pivot bin towards and into a home position after the pivot bin is moved into the closed position.

2. The stowage bin assembly of claim 1, wherein the bin drive system is securely fixed to the strongback.

3. The stowage bin assembly of claim 1, wherein the motion link extends over an arcuate path.

4. The stowage bin assembly of claim 1, further comprising a latch that securely latches the pivot bin in the closed position.

5. The stowage bin assembly of claim 1, further comprising an engagement button secured to the pivot bin, wherein the engagement button is configured to be engaged to move the pivot bin from the open position towards and into the closed position.

6. The stowage bin assembly of claim 1, further comprising one or more sensors that are configured to output sensor alert signals that cease movement of the pivot bin towards the closed position.

7. The stowage bin assembly of claim 6, wherein the one or more sensors comprises a current sensor that is configured to detect a current drawn or output by the motor.

8. The stowage bin assembly of claim 6, wherein the one or more sensors comprises a proximity or motion sensor that is configured to detect the presence of an object.

9. The stowage bin assembly of claim 1, further comprising a drive control unit in communication with the bin drive system, wherein the drive control unit is configured to control operation of the bin drive system.

10. The stowage bin assembly of claim 1, wherein the motion link comprises a belt, wherein the bin actuator is operatively connected to the belt through a carriage, wherein the bin actuator includes a pusher that is configured to push a protuberance extending from a rear surface of the pivot bin to move the pivot bin from the open position to the closed position, and wherein the pusher is configured to separate from the protuberance after the pivot bin is moved into the closed position.

11. The stowage bin assembly of claim 1, wherein the bin actuator is positioned behind a pivot point of the pivot bin as the pivot bin is moved between the open position and the closed position.

12. The stowage bin assembly of claim 1, wherein the bin actuator is configured to move downwardly and push the pivot bin into the closed position.

13. A method of operating a stowage bin assembly within an interior cabin of a vehicle, the method comprising:
    moveably coupling a pivot bin to a strongback within the interior cabin;
    operatively coupling a motor of a bin drive system to a bin actuator through a motion link;
    opening the pivot bin into an open position; and
    moving the pivot bin from the open position to a closed position by the bin drive system, wherein the moving comprises operating the motor to move the bin actuator via the motion link to push the pivot bin from the open position to the closed position, and moving the bin actuator away from a portion of the pivot bin towards and into a home position after the pivot bin is moved into the closed position.

14. The method of claim 13, further comprising securely fixing the bin drive system to the strongback.

15. The method of claim 13, further comprising:
    securely latching the pivot bin in the closed position with a latch;
    engaging an engagement button to move the pivot bin from the open position towards and into the closed position; and
    ceasing movement of the pivot bin towards the closed position in response to sensor alert signals being output from one or more sensors.

16. The method of claim 13, further comprising:
    communicatively coupling a drive control unit with the bin drive system; and
    controlling operation of the bin drive system with the drive control unit.

17. A stowage bin assembly that is configured to be disposed within an interior cabin of a vehicle, the stowage bin assembly comprising:
    a strongback;
    a pivot bin moveably coupled to the strongback, wherein the pivot bin is configured to be moved between an open position and a closed position;
    a bin drive system securely fixed to the strongback, wherein the bin drive system is configured to move the pivot bin from the open position to the closed position, wherein the bin drive system comprises a motor operatively coupled to a bin actuator through a motion link, wherein the motor is configured to move the bin actuator via the motion link to push the pivot bin from the open position to the closed position, wherein the bin actuator is configured to be moved away from a portion of the pivot bin towards and into a home position after the pivot bin is moved into the closed position, wherein the bin actuator is positioned behind a pivot point of the pivot bin as the pivot bin is moved between the open position and the closed position, and wherein the bin actuator is configured to move downwardly and push the pivot bin into the closed position;
    a latch that securely latches the pivot bin in the closed position;
    an engagement button secured to the pivot bin, wherein the engagement button is configured to be engaged to move the pivot bin from the open position towards and into the closed position;

one or more sensors that are configured to output sensor alert signals that cease movement of the pivot bin towards the closed position; and a drive control unit in communication with the bin drive system, the latch, the engagement button, and the one or more sensors, wherein the drive control unit is configured to control operation of the bin drive system.

18. The stowage bin assembly of claim 17, wherein the motion link comprises a belt, wherein the bin actuator is operatively connected to the belt through a carriage, wherein the bin actuator includes a pusher that is configured to push a protuberance extending from a rear surface of the pivot bin to move the pivot bin from the open position to the closed position, and wherein the pusher is configured to separate from the protuberance after the pivot bin is moved into the closed position.

19. The stowage bin assembly of claim 17, wherein the motion link extends over an arcuate path.

20. The stowage bin assembly of claim 17, wherein the one or more sensors comprises a current sensor that is configured to detect a current drawn or output by the motor, or a proximity or motion sensor that is configured to detect the presence of the object.

* * * * *